(12) United States Patent  
Yokota

(10) Patent No.: US 9,326,229 B2  
(45) Date of Patent: Apr. 26, 2016

(54) GATEWAY DEVICE AND GATEWAY SELECTION METHOD

(71) Applicant: FUJITSU LIMITED, Kawasaki-shi, Kanagawa (JP)

(72) Inventor: Fumihiko Yokota, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 186 days.

(21) Appl. No.: 14/041,111

(22) Filed: Sep. 30, 2013

(65) Prior Publication Data

US 2014/0023029 A1   Jan. 23, 2014

Related U.S. Application Data

(63) Continuation of application No. PCT/JP2011/058348, filed on Mar. 31, 2011.

(51) Int. Cl.
| | |
|---|---|
| *H04W 48/20* | (2009.01) |
| *H04L 12/803* | (2013.01) |
| *H04W 28/08* | (2009.01) |
| *H04W 48/00* | (2009.01) |
| *H04L 12/801* | (2013.01) |

(52) U.S. Cl.
CPC ............ *H04W 48/20* (2013.01); *H04L 47/125* (2013.01); *H04W 28/08* (2013.01); *H04W 48/17* (2013.01); *H04L 47/14* (2013.01)

(58) Field of Classification Search
None
See application file for complete search history.

(56) References Cited

U.S. PATENT DOCUMENTS

| | | | |
|---|---|---|---|
| 2003/0235168 A1 | 12/2003 | Sharma et al. | |
| 2004/0095881 A1 | 5/2004 | Borella et al. | |
| 2004/0243718 A1 | 12/2004 | Fujiyoshi | |
| 2005/0122942 A1 | 6/2005 | Rhee et al. | |
| 2006/0221986 A1* | 10/2006 | Berg | 370/401 |
| 2008/0019323 A1 | 1/2008 | Backman et al. | |
| 2010/0003993 A1 | 1/2010 | Engström | |

(Continued)

FOREIGN PATENT DOCUMENTS

| | | |
|---|---|---|
| JP | 2004-064182 | 2/2004 |
| JP | 2004-350188 | 12/2004 |
| JP | 2005-176295 | 6/2005 |

(Continued)

OTHER PUBLICATIONS

*Pseudo-CR on DNA alternative for EPS*, 3GPP TSG CT WG4 Meeting #39bis, C4-081548, Zagreb, Croatia, Jun. 23-27, 2008 (4 pp.).

(Continued)

*Primary Examiner* — Hassan Kizou
*Assistant Examiner* — Ashil Farahmand
(74) *Attorney, Agent, or Firm* — Staas & Halsey LLP

(57) ABSTRACT

In a gateway selection method, a pair of a first gateway and a second gateway to perform a process of establishing a path for user data that connects a first network and a second network is selected from a plurality of first gateways that are gateways with the first network and a plurality of second gateways that are gateways with the second network. The first gateways and the second gateways are included in an intermediate network connecting the first network with the second network. The method comprises selecting the first gateway forming the pair from the first gateways based on an establishment request message for the path, and selecting, when one of the second gateways is implemented on a physical device on which the selected first gateway is implemented, the one of the second gateways as the second gateway forming the pair.

10 Claims, 8 Drawing Sheets

(56) References Cited

U.S. PATENT DOCUMENTS

2010/0039993 A1 2/2010 Ramankutty et al.
2011/0230193 A1* 9/2011 Vikberg et al. ............... 455/436

FOREIGN PATENT DOCUMENTS

| JP | 2005-530426 | 10/2005 |
|---|---|---|
| JP | 2008-517521 | 5/2008 |
| WO | WO2010/102127 | 9/2010 |

OTHER PUBLICATIONS

*3rd Generation Partnership Project; Technical Specification Group Core Network and Terminals; Doman Name System Procedures; Stage 3 (Release 10)*, 3GPP TS 29.303 V10.0.0, Dec. 2010, pp. 1-51.

*3rd Generation Partnership Project; Technical Specification Group Services and System Aspects; General Packet Radio Service (GPRS) enhancements for Evolved Universal Terrestrial Radio Access Network (E-UTRAN) access (Release 10)*, 3GPP TS 23.401 V10.3.0, Mar. 2011, pp. 1-278.

Extended European Search Report, dated Aug. 4, 2014, in corresponding European Application No. 11862684.5 (10 pp.).

Japanese Office Action mailed Aug. 12, 2014 in corresponding Japanese Patent Application No. 2013-507012.

International Preliminary Report on Patentability, dated Oct. 21, 2013, in corresponding International Application No. PCT/JP2011/058348 (11 pp.).

International Search Report, dated May 10, 2011, in corresponding International Application No. PCT/JP2011/058348 (2 pp.).

* cited by examiner

FIG. 6

SESSION ESTABLISHING REQUIREMENT SIGNAL (Create Session Request)

| Information elements | Description | Remarks |
|---|---|---|
| IMSI | ID FOR UNIQUELY IDENTIFYING USER | |
| MSISDN | PHONE NUMBER ASSIGNED TO USER | |
| ME Identity (MEI) | ID FOR UNIQUELY IDENTIFYING TERMINAL | |
| User Location Information (ULI) | INFORMATION RELATING TO LOCATION OF USER | |
| Serving Network | INFORMATION INDICATING ACCESS FROM LTE | |
| RAT Type | WIRELESS ACCESS METHOD | |
| Indication Flags | COLLECTION OF FLAGS INDICATING INSTRUCTION RELATING TO SIGNAL PROCESSING | |
| Sender F-TEID for Control Plane | ADDRESS INFORMATION OF SIGNAL TRANSMISSION SOURCE | |
| PGW S5/S8 Address for Control Plane or PMIP | ADDRESS INFORMATION OF P-GW REQUESTING CONNECTING | ※1 |
| Access Point Name (APN) | LOGICAL NAME OF NETWORK TO WHICH CONNECTION IS TO BE ESTABLISHED | ※2 |
| Selection Mode | INFORMATION ABOUT WHETHER CONTRACT APN IS DESIGNATED | |
| PDN Type | VERSION OF IP REQUESTED TO BE ALLOCATED TO TERMINAL (CONTRACT) | |
| PDN Address Allocation (PAA) | VERSION OF IP REQUESTED TO BE ALLOCATED TO TERMINAL (TERMINAL REQUEST) | |
| Maximum APN Restriction | DESIGNATION REGARDING APN SELECTION | |

※1 USED FOR P-GW DETERMINATION, ※2 USED FOR APN DETERMINATION

FIG. 7

SESSION ESTABLISHING REQUIREMENT SIGNAL (Create Session Request)

| Information elements | Description | Remarks |
|---|---|---|
| Aggregate Maximum Bit Rate (APN-AMBR) | COMMUNICATION BAND ON PER-APN BASIS | |
| Linked EPS Bearer ID | ID OF RELATED BEARER | |
| Bearer Contexts to be created | ATTRIBUTE OF BEARER TO BE GENERATED | |
| Bearer Contexts to be removed | DESIGNATION OF BEARER TO BE DELETED | |
| Trace Information | INFORMATON RELATING TO SIGNAL TRACE | |
| Recovery | INFORMATION FOR PERFORMING INFORMATION CONSISTENCY BETWEEN NODES | |
| MME-FQ-CSID | INFORMATION FOR PERFORMING INFORMATION CONSISTENCY BETWEEN NODES (MME) | |
| SGW-FQ-CSID | INFORMATION FOR PERFORMING INFORMATION CONSISTENCY BETWEEN NODES (SGW) | |
| UE Time Zone | TIME ZONE OF TERMINAL | |
| Charging Characteristics | ATTRIBUTE OF CHARGE | |
| Private Extension | OPERATOR EXTENSION PARAMETER | |

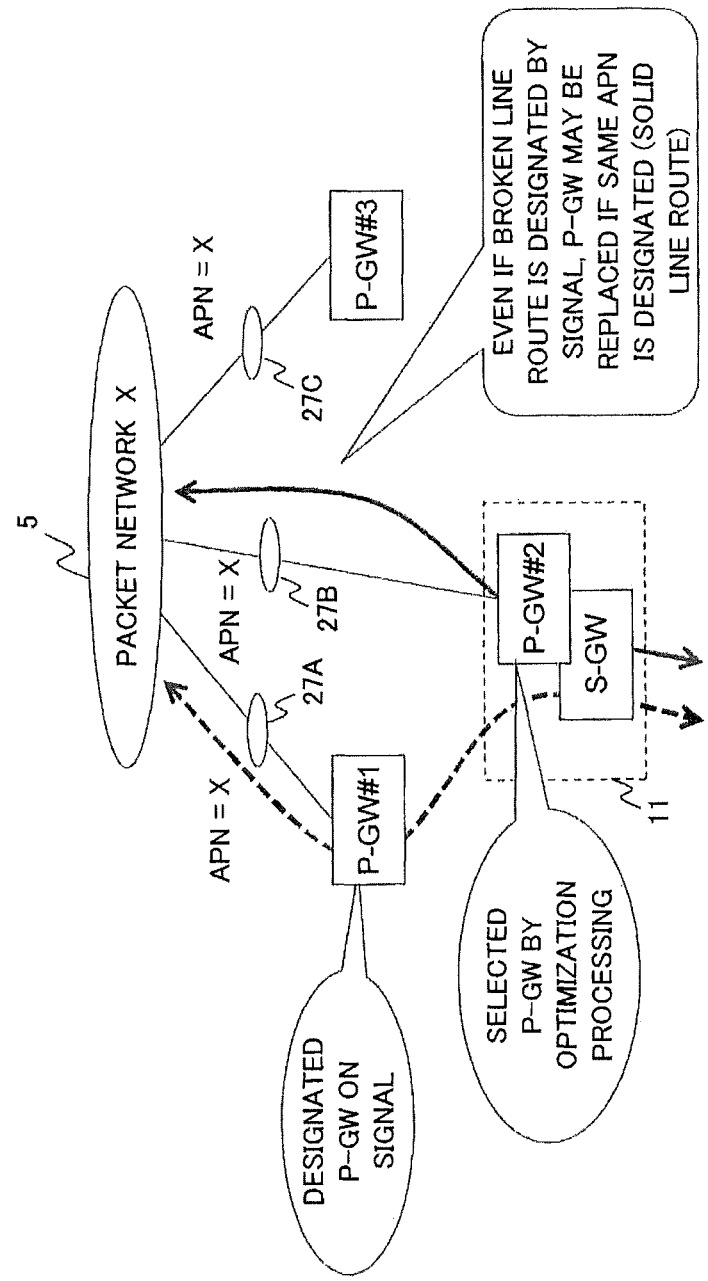

GATEWAY DEVICE AND GATEWAY SELECTION METHOD

CROSS-REFERENCE TO RELATED APPLICATION

This application is based upon and claims the benefit of priority of the International Patent Application No. PCT/JP2011/058348, filed on Mar. 31, 2011, the entire contents of which are incorporated herein by reference.

FIELD

Disclosure relates to a gateway device and a gateway selection method.

BACKGROUND

Communication standards for the next generation mobile phone called Long Term Evolution (LTE) are being considered by 3GPP ($3^{rd}$ Generation Partnership Project), which is a standardization organization related to mobile phone (cellular phone) technology.

An LTE network includes an Evolved Universal Terrestrial Radio Network (eUTRAN), which is a wireless network accommodating wireless terminals (User Equipment: UE), and an Evolved Packet Core (EPC: also referred to as LTE-Core), which is a core network (CN).

The wireless network (eUTRAN) is an access network, including at least one base station (referred to as eNodeB (eNB)), for connecting, to the EPC, a wireless terminal (referred to as User Equipment: UE) to be attached to the base station.

The EPC includes a Mobility Management Entity (MME), a Serving Gateway (S-GW), and a Packet Data Network Gateway (P-GW).

The MME is a control device to handle a Control plane (C-plane) for network control. The MME is connected to a base station via an S1-MME interface which is an S1 interface for the C-plane. Also, the MME is connected to a device called a Home Subscriber Server (HSS) that handles service control and/or subscriber data, via an interface (an S6a interface) for the C-plane.

The S-GW is a gateway located between the access network (eUTRAN) and the EPC, and handles a User plane (U-plane), which is packet data of user data. The S-GW is connected to a base station via an S1-U interface which is an S1 interface for the U-plane. Also, the S-GW is connected to the MME via an interface for the C-plane called "S11 interface".

The P-GW is a gateway for connecting the UE to an external network (a user packet network) such as the Internet. The P-GW is connected to the S-GW via interfaces for the C-plane and the U-plane (S5 PMIP, etc.). Thus, the EPC includes architecture by which a U-plane packet (user data) is relayed via two nodes, the S-GW and the P-GW.

For more information, see Japanese Laid-Open Patent Publication No. 2004-64182, and Japanese Laid-Open Patent Publication No. 2004-350188.

According to the current EPC, selection of the S-GW and the P-GW for a certain U-plane is performed by the MME, which is a physical device different from the S-GW and the P-GW. The MME does not take the physical arrangement of the S-GW and the P-GW into account when selecting the S-GW and the P-GW.

SUMMARY

One of aspects of the invention is a gateway device installed on an intermediate network where a pair of a first gateway and a second gateway selected from a plurality of first gateways that are gateways with a first network and a plurality of second gateways that are gateways with a second network performs a process for establishing a path for user data that connects the first network with the second network.

The gateway device includes:

at least one physical device on which one of the plurality of first gateways and one of the plurality of second gateways are implemented;

a receiving unit to receive an establishment request message for the path;

a first gateway selection unit to select one of the plurality of first gateways implemented on the physical device as the first gateway forming the pair, based on the establishment request message; and a second gateway selection unit to select one of the plurality of second gateways implemented on the physical device as the second gateway forming the pair when one of the plurality of first gateways implemented on the physical device is selected as the first gateway forming the pair.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6 is a table illustrating information elements included in a create session request signal;

FIG. 7 is a table illustrating information elements included in a create session request signal; and FIG. 8 is a diagram for describing an advantage of a PGW selection process that takes APN into account.

DESCRIPTION OF EMBODIMENTS

Hereinafter, an embodiment of the present invention will be described with reference to the drawings. The configuration of the embodiment is merely an example, and the present invention is not restricted by the configuration of the embodiment.

Figure 1:
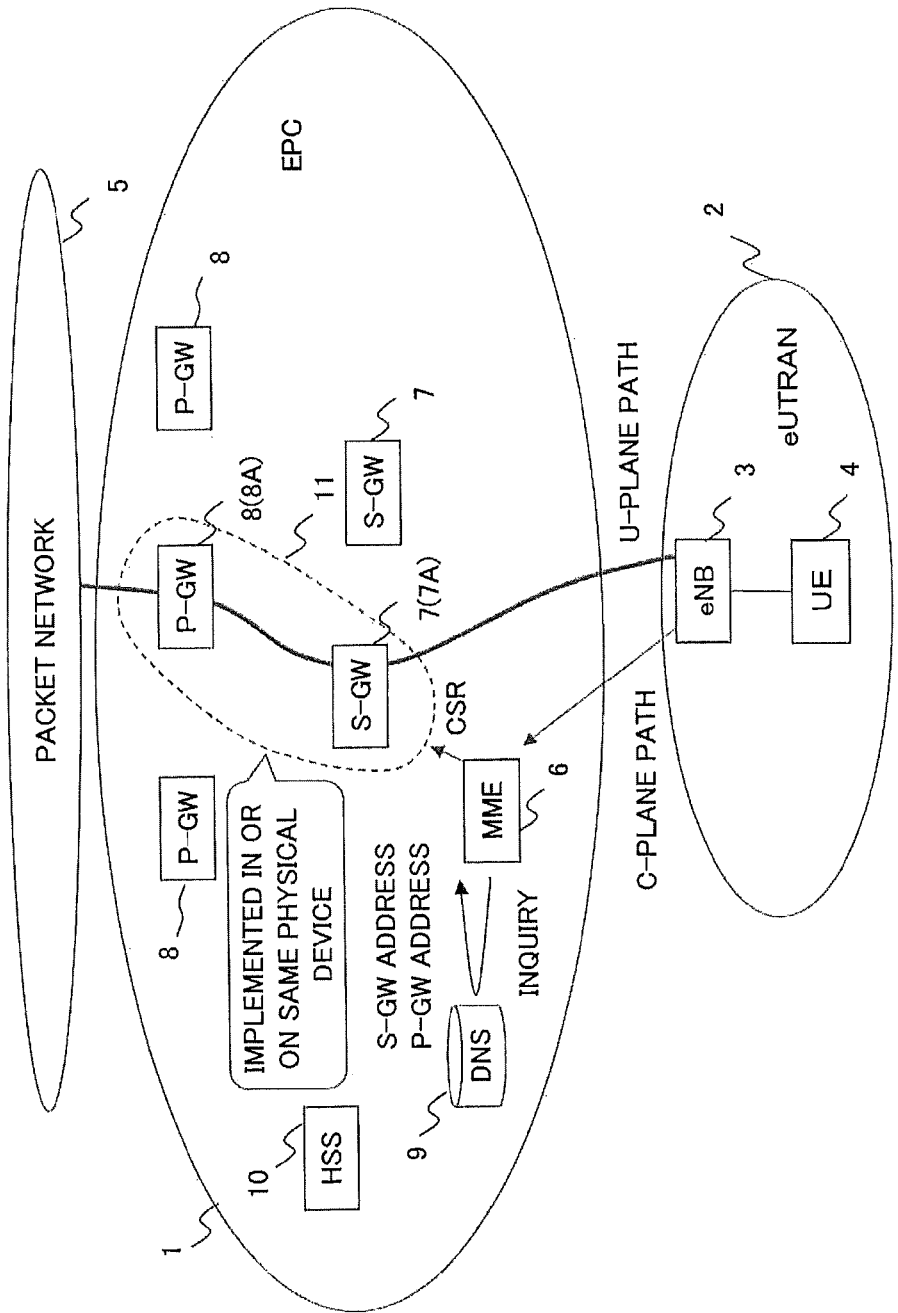
FIG. 1 is a diagram schematically illustrating an LTE network relating to an embodiment of the present invention.

FIG. 1 is a diagram schematically illustrating an LTE network according to an embodiment of the present invention. In FIG. 1, the LTE network includes a core network 1 (intermediate network) which is an EPC, and a wireless network (eUTRAN) 2 which is an access network for the EPC. The core network 1 is connected to an external network, such as a packet network 5. The wireless network 2 is an example of a first network, and the packet network 5 is an example of a second network.

A plurality of base stations (eNB; one base station 3 is illustrated in FIG. 1) are generally located in the wireless network 2. The base station 3 may accommodate a wireless terminal (UE) 4 existing in a communication range (cell) of the base station 3.

The core network 1 includes an MME 6 that handles a C-plane, a plurality of S-GWs (also written as SGW(s)) 7, a plurality of P-GWs (also written as PGW(s)) 8, a domain name server (DNS) 9, and an HSS 10. The MME 6 is connected to the base station 3 via an S1-MME interface which is an S1 interface for the C-plane. The MME 6 is also connected to the HSS 10 via an interface (an S6a interface) for the C-plane.

The wireless terminal 4 performs an attach procedure with the core network 1 via the base station 3 for the wireless terminal 4 communicating with a communication counterpart (a correspondent node: CN) that is connected to an external network (in FIG. 1, the packet network 5) via the wireless network 2 and the core network 1.

The attach procedure starts from transmission of an attach request message (Attach Request) by the wireless terminal 4 to the base station 3. The attach request message reaches the MME 6 via the base station 3. In response to the attach request, the MME 6 performs check of a subscriber (at the time of first attach) of the wireless terminal 4 through communication with the HSS 10, and location register of the wireless terminal 4 to the HSS 10. The MME 6 further performs an authentication procedure with the wireless terminal 4. Then, an encryption procedure is performed on communication between the MME 6 and the wireless terminal 4.

Moreover, the MME 6 inquires, to the DNS 9, an IP address of the PGW 8 which is to perform a process to establish a path (a session) of the U-plane for the wireless terminal 4. At this time, an inquiry is made about the IP address of the PGW 8 corresponding to the packet network 5 which is the connection destination of the wireless terminal 4. For example, an inquiry is made about the IP address of the PGW 8 according to an APN (described later) included in the attach request. The MME 6 may obtain the IP address of the PGW 8 by the inquiry. The MME 6 may obtain an IP address of the SGW 7 that establishment of the session is to be requested, by inquiring to the DNS 9 using location information of the wireless terminal 4 as key information.

Then, the MME 6 generates a create session request message (a create session request signal: Create Session Request: CSR) for requesting the SGW 7 and the PGW 8 for establishment of the session of the U-plane (a path for user packets (user data)). The create session request signal is transmitted to a gateway device (GW device) having the IP address that the MME 6 has acquired from the DNS 9 in advance, and finally reaches a pair of the SGW 7 and the PGW 8 which are to perform the session creation process (session establishment process). The SGW 7 and the PGW 8 each perform a process for creating a session of the U-plane to create a U-plane session (a U-plane path) that links the base station 3 and the packet network 5.

When the processes of the SGW 7 and the PGW 8 are complete, a Create Session Response message, which is a response signal to the create session request signal, is returned to the MME 6. Then, the MME 6 transmits an Attach Accept message, which is a response signal for the attach request, to the wireless terminal 4. When the Attach Accept is received, the wireless terminal 4 transmits an Attach Complete message, which is an attach procedure complete signal.

The MME 6 which has received the Attach Complete transmits a Modify Bearer Request to the SGW 7 and the PGW 8 to generate a default bearer for the wireless terminal 4. The SGW 7 and the PGW 8 perform processes according to the Modify Bearer Request, and then return a response signal "Modify Bearer Response" to the MME 6. Then, a default bearer for the U-plane is generated between the wireless terminal 4, and the SGW 7 and the PGW 8. The U-plane path is thereby established between the wireless terminal 4 and the packet network 5, and IP communication is enabled between the wireless terminal 4 and a CN connected to the packet network 5.

In the present embodiment, an SGW 7 and a PGW 8 (an SGW 7A and a PGW 8A in FIG. 1) implemented in or on the same physical device are selected, in the attach procedure described above, as the SGW 7 and the PGW 8 for performing the U-plane path creation process.

Figure 2:
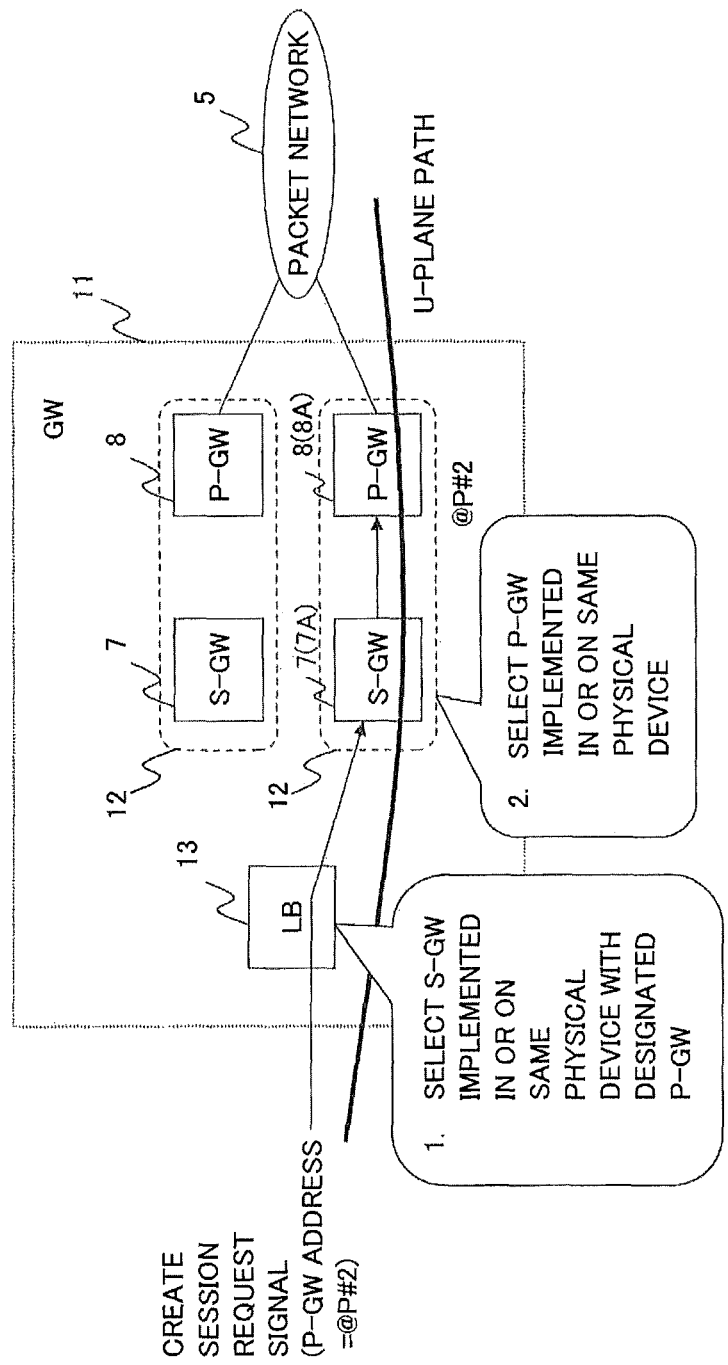
FIG. 2 schematically illustrates a gateway device (a GW device) located on a core network illustrated in FIG. 1.

FIG. 2 schematically illustrates a gateway device (a GW device) located on the core network 1 illustrated in FIG. 1. In FIG. 2, a GW device 11 includes a chassis accommodating a plurality of physical devices called "blades" (hereinafter referred to as blade(s) 12). Each blade 12 is provided with electrical and electronic circuits (hardware) for achieving function(s) of the SGW 7 and function(s) of the PGW 8, respectively.

The hardware may include a storage to store programs and data to be used at the time of executing programs, a processor to execute the programs stored in the storage (for example a Central Processing Unit (CPU) (also referred to as a Micro Processing Unit (MPU)), or a Digital Signal Processor (DSP)), and a part of the functions of the SGW 7 and the PGW 8 may be achieved by software processing.

Also, the GW device 11 includes a load balancing device (load balancer (LB)) 13 to sort signals (messages) received by a communication interface, not illustrated, to respective blades 12.

The create session request signal described with respect to the attach procedure described above reaches the LB 13. The create session request signal includes the IP address ("@P#2" in the example of FIG. 2) of the PGW 8 which is to perform the U-plane path creation process.

The LB 13 receiving the create session request signal transmits (sorts) the create session request signal to the blade 12 on which the PGW 8 (the PGW 8A in FIG. 2) having the IP address (a designated address) of the PGW 8 included in the create session request signal is implemented.

In the blade 12 to which the create session request signal is transmitted, the create session request signal is first received by the SGW 7 (7A). The SGW transfers the create session request signal to the PGW 8 (the PGW 8A) implemented into the same physical device (the blade 12). The SGW 7 and the PGW 8 receiving the create session request signal each perform a process for creating a U-plane path to the packet network 5. When the processes are complete, the SGW 7A or the PGW 8A transmits a response signal (a Create Session Response) for the create session request signal to the MME 6. As described, according to the GW device 11 of the present embodiment, the SGW 7 and the PGW 8 are selected such that a U-plane session is created by the SGW 7 and the PGW 8 implemented into the same physical device.

Figure 3:
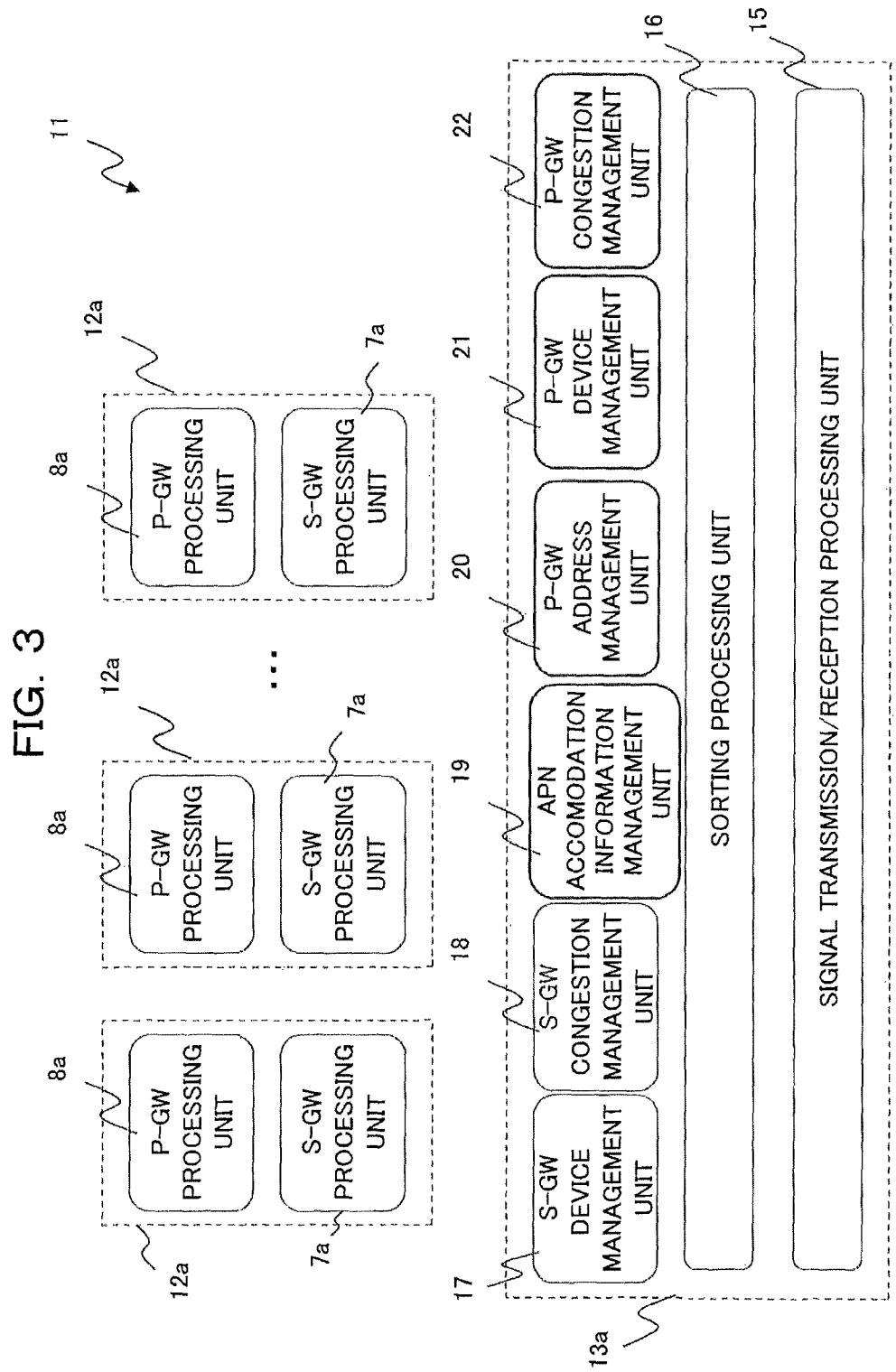
FIG. 3 schematically illustrates a function of the GW device illustrated in FIG. 2.

FIG. 3 schematically illustrates a function of the GW device 11 illustrated in FIG. 2. In FIG. 3, the GW device 11 includes a plurality of call processing units 12a, and a sorting unit 13a. Each call processing unit 12a and the sorting unit 13a are treated as independent physical devices.

The call processing unit 12a corresponds to the blade 12 illustrated in FIG. 2, and includes an SGW processing unit 7a that achieves the function of the SGW 7, and a PGW processing unit 8b that achieves the function of the PGW 8.

The sorting unit 13a has the functions of the LB 13 illustrated in FIG. 2 and a communication interface. The sorting unit 13a includes a signal transmission/reception processing unit (transmission/reception unit, communication unit) 15 serving the function of the communication interface, and a sorting processing unit 16.

The sorting processing unit 16 has an SGW selection function that takes into account the load on a plurality of SGW processing units 7a (SGWs 7) provided to the GW device 11. Furthermore, the sorting processing unit 16 also has an PGW selection function (an alternative PGW selection function) that takes into account the IP address of the PGW 8 of the GW device 11 and an access point name (APN) of an access point accommodated in the PGW 8 of the GW device 11.

Moreover, the sorting unit 13a includes an SGW device management unit 17, an SGW congestion management unit 18, an access point name (APN) accommodation information management unit 19, a PGW address management unit 20, a PGW device management unit 21, and a PGW congestion management unit 22.

The SGW device management unit 17 manages operation information of a plurality of SGWs 7 (the SGWs achieved by the SGW processing units 7a) of the GW device 11. As the operation information, information indicating whether each SGW 7 is in service or out of service is managed. The SGW congestion management unit 18 manages congestion information of the plurality of SGWs 7 (the SGW processing units 7a) of the GW device 11. As the congestion information, information indicating presence or absence of congestion of each SGW 7 is managed.

The APN accommodation information management unit 19 manages the IP address of the PGW 8 (the PGW achieved by the PGW processing unit 8a) accommodating an access point for the packet network 5 (FIGS. 1 and 2). The APN is a logical name assigned to an access point for the packet network 5 which is the connection destination of the wireless terminal 4. For example, the APN accommodation information management unit 19 manages information that an APN is associated with identification information of the PGW 8 accommodating an access point with the APN. The information may be managed by a table storing an APN and identification information of a PGW 8 in association with each other.

The PGW address management unit 20 manages the IP addresses of a plurality of PGWs 8 of the GW device 11. The IP addresses may be managed by a table or by a list.

The PGW device management unit 21 manages operation information of the plurality of PGWs 8 of the GW device 11. As the operation information, information indicating whether each PGW 8 is in service or out of service (stopped; for example, interrupted, or suspended due to maintenance) is managed. The PGW congestion management unit 22 manages congestion information of the plurality of PGWs 8 of the GW device 11. As the congestion information, information indicating presence or absence of congestion of each PGW 8 is managed.

Figure 4:
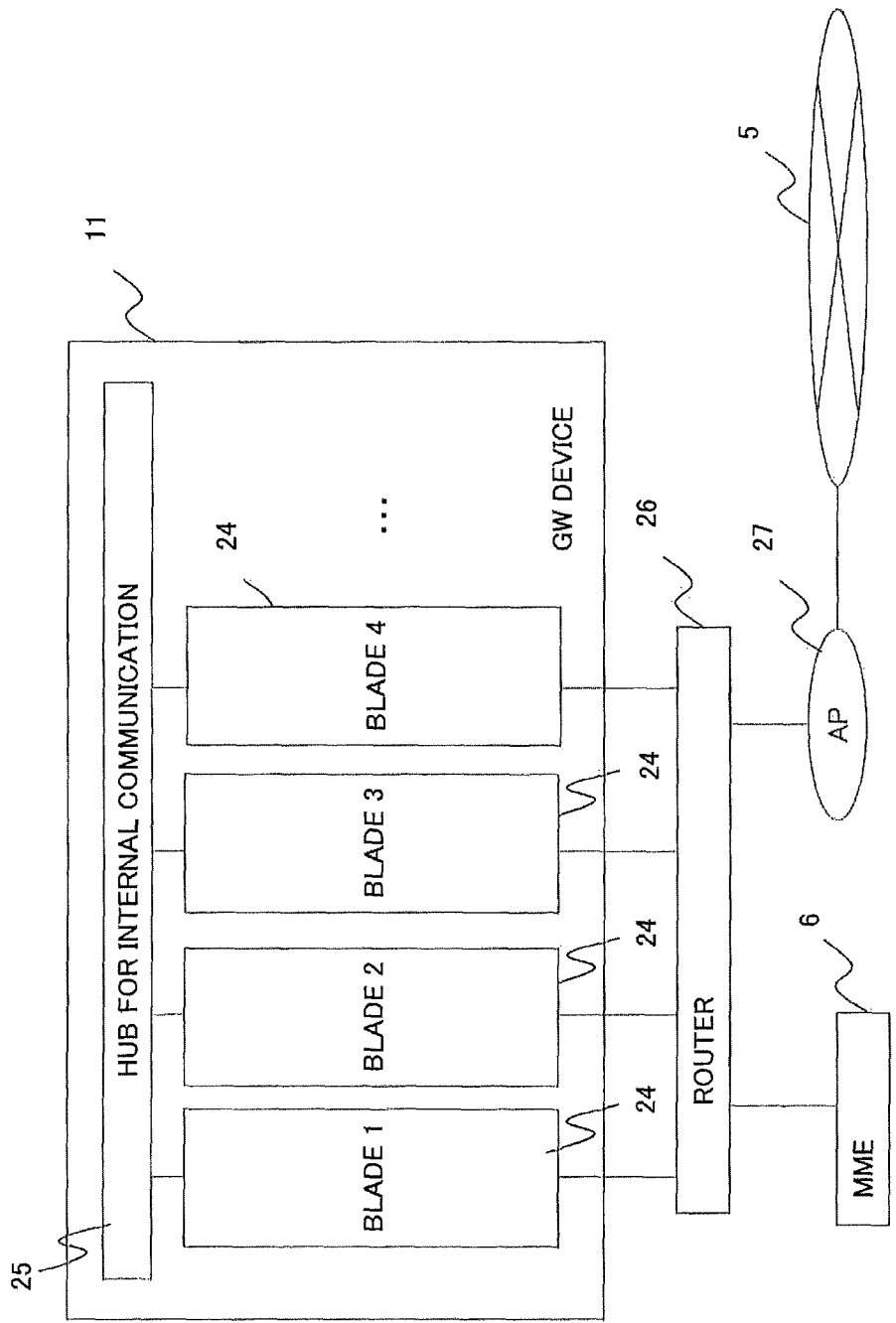
FIG. 4 illustrates an example configuration of the GW device.

FIG. 4 is an example configuration of the GW device 11. FIG. 4 exemplifies the GW device 11 which is a blade server including a chassis accommodating a plurality of blades 24, and an internal communication HUB 25 connecting the blades 24. Each blade 24 is provided with electrical and electronic circuits (hardware) for achieving the sorting unit 13a and one of call processing units 12a illustrated in FIG. 3.

The hardware may include a storage and a processor for performing software processing. In other words, each functional block illustrated in FIG. 3 may be achieved by dedicated or general-purpose hardware (electrical/electronic circuit such as an IC, an LSI or an ASIC), or software processing by a storage and a processor, or a combination of hardware processing and software processing.

Also, in FIG. 4, each blade 24 is connected to a router 26 via a physical link, and is connected to the MME 6 or an access point (AP) 27 of the packet network 5 via the router 26. The router 26 is connected to the sorting unit 13a. A configuration is generally adopted where the sorting unit 13a in one of the plurality of blades 24 exclusively receives the create session request signals from the MME 6, and where the sorting unit 13a of this blade 24 determines the sorting unit 13a that performs the process illustrated in FIG. 5 in such a way that the load is balanced, but this is not restrictive.

Moreover, a configuration may be adopted where the sorting unit 13a is provided to any one of the plurality of blades 24, instead of providing the sorting unit 13a to each blade 24. In this case, the blade on which the sorting unit 13a is implemented may be a blade that does not include the call processing unit 12a. In the case where the GW device 11 includes a single sorting unit 13a as described above, the blade 24 including the sorting unit 13a is connected to the MME 6, and the create session request signals from the MME 6 for the GW device 11 are received exclusively by this blade 24.

Figure 5:
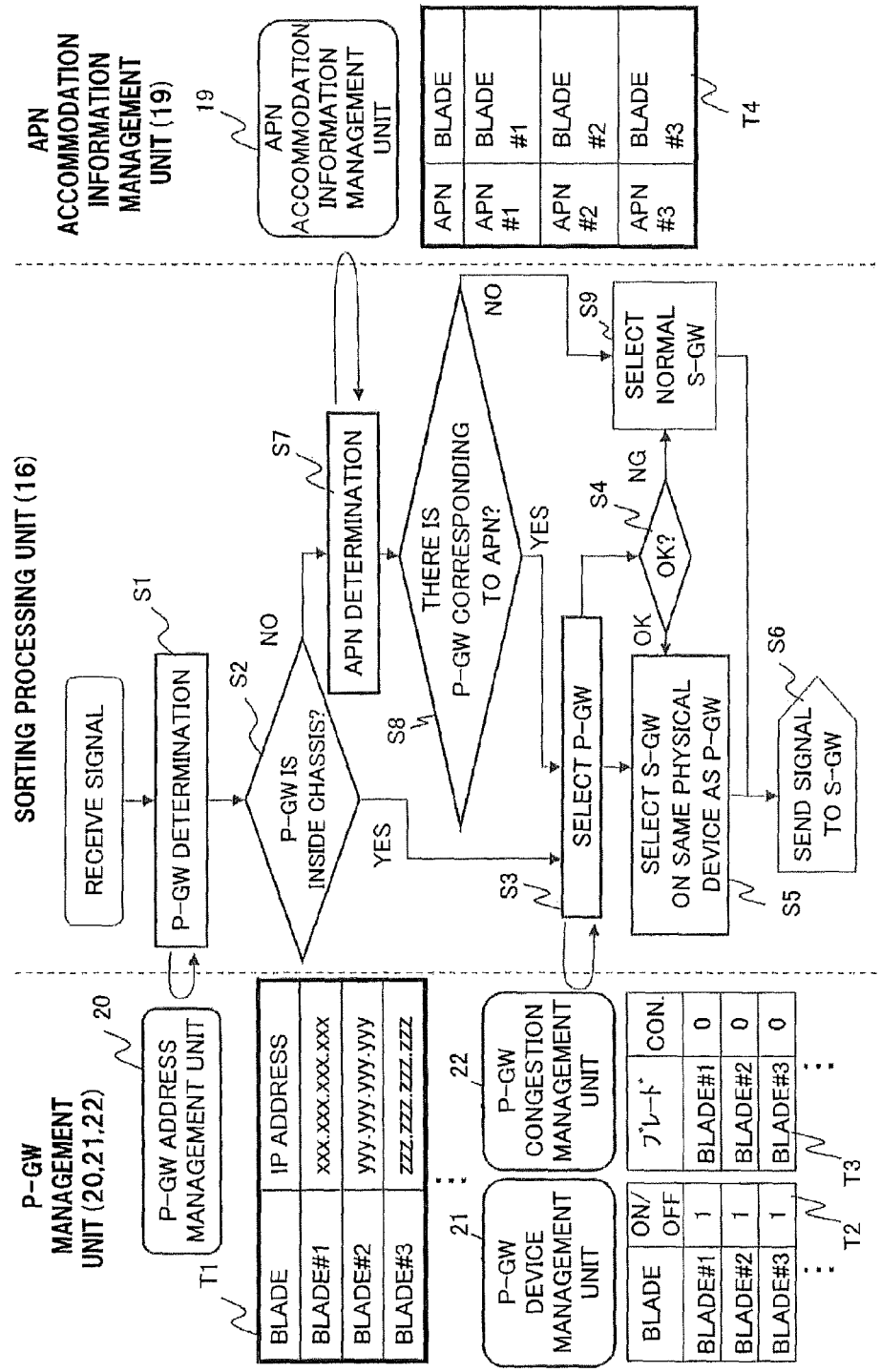
FIG. 5 is a flow chart illustrating an example process inside the GW device illustrated in FIGS. 3 and 4.

FIG. 5 is a flow chart illustrating an example process inside the GW device 11 illustrated in FIGS. 3 and 4. The process illustrated in FIG. 5 is started by reception of a create session request signal by the sorting processing unit 16 of the sorting unit 13a via the signal transmission/reception processing unit 15. Additionally, in FIG. 5, the PGW address management unit 20, the PGW device management unit 21, and the PGW congestion management unit 22 are collectively referred to as a "PGW management unit".

FIGS. 6 and 7 are tables illustrating information elements included in the create session request signal. In the process of the sorting processing unit 16 illustrated in FIG. 5, "PGW S5/S8 Address for Control Plane or PMIP" illustrated in FIG. 6 indicates address information (an IP address) of the PGW 8 to which connection is requested, and this is used in step S1 (PGW determination) in FIG. 5. Also, "Access Point Name (APN)" illustrated in FIG. 6 indicates a logical name of a network (the packet network 5) for which connection is to be established, and this is used in step S7 (APN determination) in FIG. 5.

Returning to FIG. 5, first, the sorting processing unit 16 performs a PGW determination process (step S1). That is, the sorting processing unit 16 determines whether a PGW 8 with the IP address of the PGW 8 (a designated PGW address) included in a create session request signal is present within the GW device 11 (the chassis). Specifically, the sorting processing unit 16 transfers the designated PGW address to the PGW address management unit 20.

The PGW address management unit 20 includes a table T1, as illustrated in FIG. 5, storing, in association with each other, the identification information (a blade number) of each blade provided into the chassis and the IP address of the PGW 8 implemented on each blade 24. When the same IP address as the designated PGW address is registered in the table T1, the PGW address management unit 20 returns the corresponding blade number to the sorting processing unit 16, and when the designated PGW address is not registered, information indicating that there is no corresponding blade number is returned to the sorting processing unit 16.

The sorting processing unit 16 determines whether a PGW 8 with the designated PGW address is present within the chassis, based on the information returned from the PGW address management unit 20 (step S2).

That is, in the case response information from the PGW address management unit 20 indicates a blade number (step S2: YES), the sorting processing unit 16 proceeds to step S3. On the other hand, in the case the response information indicates that there is no blade number (step S2: NO), the sorting processing unit 16 proceeds to step S5.

A PGW selection process is performed in step S3. That is, the sorting processing unit 16 transfers the blade number acquired from the PGW address management unit 20 to the PGW device management unit 21 and the PGW congestion management unit 22.

The PGW device management unit 21 includes a table T2, as illustrated in FIG. 5, storing, in association with each other, the blade number and information (ON/OFF information) indicating whether the PGW 8 implemented into each blade is in service (ON: 1) or is suspended or interrupted (OFF: 0). The PGW device management unit 21 reads ON/OFF identification information corresponding to a blade number from the table T2, and returns the same to the sorting processing unit 16. Additionally, the PGW device management unit 21 monitors ON/OFF of each PGW 8 inside the chassis, and updates the ON/OFF information of the table T2 according to the monitoring result.

The PGW congestion management unit 22 includes a table T3, as illustrated in FIG. 5, storing, in association with each other, the blade number and congestion information indicating presence/absence (presence: 1, absence: 0) of congestion of the PGW 8 implemented on each blade. Management of the congestion state of the PGW 8 may also include, in addition to the presence/absence of congestion, the relative degree of congestion of each blade. The PGW congestion management unit 21 reads the information indicating presence/absence of congestion corresponding to a blade number from the table T3, and returns the same to the sorting processing unit 16. Additionally, the PGW congestion management unit 22 monitors presence/absence of congestion of each PGW 8 inside the chassis, and updates the congestion information in the table T3 according to the monitoring result.

In the case the responses from the PGW device management unit 21 and the PGW congestion management unit 22 indicate that the PGW 8 (a designated PGW) with the designated PGW address is in service (ON "1"), and that there is no congestion ("0") (step S4: OK), the sorting processing unit 16 proceeds to step S5, and in other cases (step S4: NG), the sorting processing unit 16 proceeds to step S9.

In step S5, the sorting processing unit 16 selects an SGW 7 implemented on the same device (the blade 24) as the designated PGW. At this time, the sorting processing unit 16 may check "in service" and "no congestion" with respect to the selected SGW 7 (perform an SGW check process). That is, the sorting processing unit 16 transfers the blade number acquired from the PGW address management unit 20 to the SGW device management unit 17 and the SGW congestion management unit 18.

The SGW device management unit 17 and the SGW congestion management unit 18 include tables (not illustrated) having the same data structures as the tables T2 and T3, respectively. Incidentally, the operation information and the congestion information to be registered in respective tables are the operation information and the congestion information of the SGW 7 implemented on each blade 24. The SGW device management unit 17 and the SGW congestion management unit 18 each monitor the operation and the congestion, and update the table.

The SGW device management unit 17 and the SGW congestion management unit 18 return the operation information and the congestion information according to the blade number to the sorting processing unit 16. In the case the response indicates "in service" and "no congestion" of the SGW 7, the sorting processing unit 16 transmits the create session request signal to the selected SGW 7 (step S6). In other cases, the sorting processing unit 16 proceeds to step S9.

When step S6 is over, the process of the sorting processing unit 16 illustrated in FIG. 5 is complete, and the process of step S1 and later will be performed with the reception of the next create session request signal as the trigger.

When the determination "NO" is made in step S2, this means that the designated PGW is not in the chassis (the GW device 11). In this case, the sorting processing unit 16 performs APN determination (step S7).

That is, the sorting processing unit 16 obtains the APN in the create session request signal, and transfers the APN to the APN accommodation information management unit 19. The APN accommodation information management unit 19 includes a table T4 storing, in association with each other, an APN and a blade number where the PGW 8 accommodating an AP 27 with the APN (the PGW 8 connected to the AP 27) is implemented.

The APN accommodation information management unit 19 reads the blade number corresponding to the APN, and returns the blade number to the sorting processing unit 16. When there is no blade number that corresponds to the APN, information indicating that there is no blade number is returned to the sorting processing unit 16.

The sorting processing unit 16 determines whether a PGW 8 accommodating an AP with the APN (referred to as "PGW accommodating the APN") is present within the chassis (the GW device 11) (step S8).

At this time, when the blade number is received from the APN accommodation information management unit 19 (step S8: YES), the sorting processing unit 16 proceeds to step S3. On the other hand, when a response "no blade number" is received by the sorting processing unit 16 (step S8: NO), the process proceeds to step S9. The processes of steps S3 to S6 are described above, and redundant description thereof is omitted. In this manner, even if a PGW 8 designated by a create session request signal is outside the chassis (is implemented into another gateway device), when there is a PGW 8 accommodating the same APN in the chassis, an alternative selection process of selecting such PGW 8 is performed.

In the case the process proceeds to step S9, the sorting processing unit 16 performs a conventional SGW selection process (SGW selection taking into account the load on the plurality of SGW processing units 7a (the SGWs 7) of the GW device 11). For example, the sorting processing unit 16 selects one SGW 7 in the chassis according to a predetermined load balancing method (for example, a round-robin method).

Incidentally, the SGW check process described with reference to step S5 may be performed in step S9, and it may be checked that the selected SGW 7 is "in service" and there is "no congestion". When "in service" and "no congestion" are not true for the selected SGW 7, the sorting processing unit 16 selects another SGW 7 in the chassis for which "in service" and "no congestion" are true. Then, the process proceeds to step S6.

Additionally, the GW device 11 may prepare in advance a blade 24 (an alternative blade) on which a PGW 8 which is to be an alternative PGW in the case the designated PGW is not allowed to be used (selected) due to being OFF or due to congestion is implemented. Information with respect to such an alternative PGW may be managed by at least one of the PGW device management unit 21 (the table T2) and the PGW congestion management unit 22 (the table T3), for example, by storing the blade number of the blade 24 on which the alternative PGW is implemented. In this case, when "NG" is determined for the designated PGW in step S4, an alternative selection process described below is performed. That is, the process of step S3 for acquiring the operation information and the congestion information for the alternative PGW (the blade number where the alternative PGW is accommodated) is performed again. The operation information and the congestion information of the alternative PGW are thereby notified (returned) to the sorting processing unit 16. Then, the process of step S4 is performed again with respect to the alternative PGW. The process may be changed to proceed to step S5 by such an alternative selection process.

A configuration as follows may also be adopted instead of the configuration described above according to which information about an alternative PGW is stored in at least one of the tables T2 and T3. That is, in the case "NG" is determined in step S4, the process proceeds to step S7. In this way, at a time of at least congestion or suspension of the designated PGW, the alternative selection process of selecting an alternative POW with the same APN as the APN accommodated by the designated PGW is performed.

The condition for the alternative selection process to be performed does not simply have to be the presence of congestion (being congested), and the degree of congestion exceeding a predetermined threshold may be taken as the condition. That is, the PGW congestion management unit 22 manages the degree of congestion of the PGW of each blade 24 and the threshold, and the sorting processing unit 16 determines "OK" or "NG" in step S4 based on whether or not the degree of congestion of a determination target PGW exceeds the threshold. In the case of OK, the process proceeds to step S5. In the case of NG, step S3 regarding the alternative PGW described above, or the processes of step S7 and later are performed.

Furthermore, the processes of steps S3 and S4 of the sorting processing unit 16 may be replaced by the following processes. That is, the sorting processing unit 16 transfers the blade number to the PGW device management unit 21, and when a response "ON" is received, transfers the blade number to the PGW congestion management unit 22. On the other hand, in the case a response "OFF" is received from the PGW device management unit 21, the sorting processing unit 16 proceeds to step S9 without transferring the blade number to the PGW congestion management unit 22. When the blade number is transferred to the PGW congestion management unit 22, the sorting processing unit 16 performs determination of step S4 according to the response (presence/absence of congestion) from the PGW congestion management unit 22. Such replacement of process is similarly applicable with respect to the check process of step S5 for the selected SGW 7.

According to the process of the GW device 11 illustrated in FIG. 5, an SGW 7 implemented on the blade where the PGW 8 with the designated PGW address in the create session request signal is implemented is selected. Accordingly, the U-plane session creation process is performed by the SGW 7 and the PGW 8 on the same blade 24, and U-plane packet communication is performed via the SGW 7 and the PGW 8 on the same blade 24. In this case, communication between the SGW 7 and the PGW 8 is direct communication within the same physical device.

Accordingly, the transmission delay may be suppressed and the throughput may be increased compared to a case where the SGW 7 and the PGW 8 are selected over different blades 24 or different GW devices 11 (chassis), that is, a case where communication between the SGW 7 and the PGW 8 is performed via the internal communication HUB 25 or a relay device such as the router 26 outside the GW device 11. Also, by avoiding communication over the blades 24 inside the GW device 11, a U-plane session utilizing the effective band of each blade 24 to the full may be created.

Also, according to the process of the GW device 11, a selection process (steps S7 and S8) of the PGW 8 that takes the APN into account is performed. FIG. 8 is a diagram for describing an advantage of a selection process of the PGW 8 that takes the APN into account.

As illustrated in FIG. 8, it is assumed that a core network 1 includes PGW#1, PGW#2, and PGW#3 that are connected to a certain packet network 5 (APN "X") via respective access points (APs) 27A, 27B, and 27C. It is also assumed that the PGW#2 is provided to the GW device 11 illustrated in FIGS. 3 and 4.

In the case a create session request signal designating, as a designated PGW address, the IP address of the PGW#1 is received by the GW device 11 in FIG. 8, the designated PGW (the PGW#1) is determined in step S2 in FIG. 5 to be outside the GW device 11 (chassis).

At this time, when it is assumed that steps S7 and S8 do not exist, the GW device 11 selects, in step S9, one of the SGWs 7 in the GW device 11 according to a predetermined load balancing method (rule), and the create session request signal is transmitted to the selected SGW 7 (S6).

The selected SGW 7 transfers the create session request signal to the PGW#1 with the designated PGW address outside the GW device 11 (chassis). Thus, a U-plane path (see the broken line arrow in FIG. 8) extending over different GW devices is created.

On the other hand, with the processes of steps S7 and S8, it is made clear that a blade 24 including the PGW#2 accommodating the AP 27B with the APN "X" is present inside the GW device 11. Accordingly, when the PGW#2 is selected instead of the PGW#1, and the SGW 7 on the blade 24 on which the PGW#2 is implemented is selected, the U-plane session may be created on the same blade 24 (see the solid line arrow in FIG. 8). The transmission delay may thereby be suppressed, and the throughput may be increased.

According to the GW device and the gateway selection method of the present embodiment, a pair of the SGW 7 and the PGW 8 implemented into the same physical device is selected. This may achieve the advantages as follows: simplification and facilitation of communication control between the SGW 7 and the PGW 8, avoidance of congestion or interruption of an external network connecting the SGW 7 and the PGW 8, reduction in the total time for a creation process based on suppression of a transmission delay, and increase in the packet transfer throughput.

Additionally, in the embodiment described above, an intermediate network (a core network: EPC) between a wireless network (eUTRAN) which is a first network and a packet network which is a second network has been illustrated. The first network and the second network are not restricted to the wireless network and the packet network. The selection method of a first gateway and a second gateway described in the present embodiment may be widely applied to a network system where one set of a first gateway and a second gateway creates a user data path in an intermediate network of the first network and the second network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A gateway device installed on an intermediate network between a first network and a second network, the intermediate network comprising a plurality of first and second gateways including a pair of a first gateway and a second gateway, where the first gateways are gateways to the first network and the second gateways are gateways to the second network, the pair configured to perform a process for establishing a path for user data, the path connecting the first network with the second network, the gateway device comprising:
    at least one physical circuit, each of which implement one of the plurality of first gateways and one of the plurality of second gateways;
    a receiving circuit configured to receive an establishment request message for the path, the establishment request message including designation information for designating the second gateway forming the pair and specification information for specifying the second network;
    a first gateway selection circuit configured to perform an alternative selection process including selecting the one of the plurality of second gateways implemented on the physical circuit instead of the second gateway designated by the designation information, when the one of the second gateways implemented on the physical circuit is not the second gateway designated by the designation information, but the one of the second gateways implemented on the physical circuit is a second gateway connected to the second network specified by the specification information;
    a second gateway selection circuit configured to select, as the first gateway forming the pair, the first gateway that is implemented on the same at least one physical circuit that implements the second selected gateway.

2. The gateway device according to claim 1, wherein the first gateway selection circuit performs the alternative selection process when the second gateway designated by the designation information is implemented on other gateway device different from the gateway device.

3. The gateway device according to claim 1, wherein the first gateway selection circuit performs the alternative selection process when the second gateway designated by the designation information is in congestion or a degree of congestion exceeds a given threshold.

4. The gateway device according to claim 1, wherein the first gateway selection circuit performs the alternative selection process when the second gateway designated by the designation information is stopped.

5. The gateway device according to claim 1, wherein the first network is a wireless network, and the second network is a packet network.

6. A gateway selection method of selecting a pair of a first gateway and a second gateway to perform a process of establishing a path for user data that connects a first network and a second network, from a plurality of first gateways that are gateways with the first network and a plurality of second gateways that are gateways with the second network, each of the plurality of first gateways and the plurality of second gateways being implemented together in a physical circuit in an intermediate network between the first network and the second network, the method comprising:
    receiving an establishment request message for the path, the establishment request message including designation information for designating the second gateway forming the pair and specification information for specifying the second network;
    selecting, via an alternative selection process, the second gateway implemented on a physical circuit instead of the second gateway designated by the designation information when the second gateway implemented on the physical circuit is not the second gateway designated by the designation information, but the second gateway implemented on the physical circuit is connected to the second network by the specification information;
    selecting, when a second gateway implemented on the physical circuit is selected as the second gateway forming the pair, a first gateway on the same physical circuit as the second gateway forming the pair.

7. The gateway selection method according to claim 6, wherein the alternative selection process is performed when the second gateway designated by the designation information is implemented on a physical circuit other than the physical circuit.

8. The gateway selection method according to claim 6, wherein the alternative selection process is performed when the second gateway designated by the designation information is in congestion, or a degree of congestion exceeds a given threshold.

9. The gateway selection method according to claim 6, wherein the alternative selection process is performed when the second gateway designated by the designation information is stopped.

10. The gateway selection method according to claim 6, wherein the first network is a wireless network, and the second network is a packet network.

* * * * *